United States Patent [19]

Matsuo et al.

[11] 3,968,309

[45] July 6, 1976

[54] MOLDED ARTICLES OF PLASTICS HAVING IMPROVED SURFACE CHARACTERISTICS AND PROCESS FOR PRODUCING THE SAME

[75] Inventors: Makoto Matsuo, Chiba; Takao Suzuki, Tokyo; Keisuke Yoshihara; Tuneo Ikeda, both of Ohtake; Kunio Chikanishi, Kawasaki, all of Japan

[73] Assignees: Dainippon Printing Co., Ltd.; Mitsubishi Rayon Co., Ltd., both of Tokyo, Japan

[22] Filed: Nov. 25, 1974

[21] Appl. No.: 526,727

[30] Foreign Application Priority Data

Nov. 26, 1973    Japan.............................. 48-131756
Sept. 6, 1974    Japan.............................. 49-101927

[52] U.S. Cl. .................................. 428/409; 264/1;
                 428/500; 428/520; 428/522; 428/918
[51] Int. Cl.² ......................................... B32B 27/30
[58] Field of Search ............... 428/409, 500, 34, 38,
                 428/262, 520, 522, 543, 918; 264/1

[56] References Cited
UNITED STATES PATENTS

| | | | |
|---|---|---|---|
| 2,464,826 | 3/1949 | Neher et al. ..................... | 428/520 X |
| 3,084,073 | 4/1963 | Kine et al. ......................... | 428/262 |
| 3,310,458 | 3/1967 | Mattimoe et al. ................. | 428/918 X |
| 3,529,995 | 9/1970 | Smith et al. ...................... | 428/262 X |

*Primary Examiner*—Harold Ansher
*Attorney, Agent, or Firm*—Armstrong, Nikaido & Wegner

[57] ABSTRACT

A molded article of plastic having on its surface a cured film of a coating material comprising at least 30% by weight of at least one polyfunctional compound selected from the group consisting of polymethacryloyloxy compounds having a molecular weight of 250 to 800 and containing at least three methacryloyloxy groups in the molecule and polyacryloyloxy compounds having a molecular weight of 250 to 800 and containing at least three acryloyloxy groups in the molecule, and optionally 0.01 to 5% by weight of a fluorine-containing surfactant and 0.01 to 5% by weight of a carbonyl compound as photosensitizer has improved surface characteristics, particularly a high surface hardness, a high surface smoothness, high heat resistance, high abrasion resistance and a minimized optical distortion. Said molded article of plastic having improved surface characteristics can be prepared by coating the molded substrate of plastic with said coating material to a thickness of 1 to 50μ and then subjecting the coated article to a light of 2,000 to 8,000 A in an inert atmosphere to cure the coating material.

14 Claims, No Drawings

MOLDED ARTICLES OF PLASTICS HAVING IMPROVED SURFACE CHARACTERISTICS AND PROCESS FOR PRODUCING THE SAME

This invention relates to molded articles of plastic excellent in light transmittance and having improved surface characteristics, particularly high surface hardness and high surface smoothness, and to a process for producing the same.

Plastics excellent in light transmittance have such advantages as being lighter in weight and higher in impact resistance than glass, and hence have heretofore been molded into and utilized as organic plate glass, chandeliers, illuminator covers, and optical lenses including condensing lenses, lenses for eyeglasses, etc. These molded articles of plastics, however, are low in surface hardness and hence are liable to be marred due to abrasion, impact and scratch derived from contact with other substances, with the result that they are deteriorated in light transmittance and beautiful appearance and thus are decreased in commodity value.

In order to improve the surface characteristics of molded substrate of plastic excellent in light transmittance, there have heretofore been proposed many processes by which on the surfaces of the molded substrate of plastics is formed a cured film of a mixture comprising an amino-alkyd resin and a polydialkylsiloxane (Japanese Laid Open Pat. application No. 71659/73); a cured film of a mixture comprising an etherified methylol melamine and a urethane-modified polyester (Japanese Pat. publication No. 109/72 and Japanese Laid Open Pat. application No. 5468/74); a cured film of a hydrolyzed tetraalkoxysilane (Japanese Laid Open Pat. application No. 14535/74); a cured film of a mixture comprising a hydrolyzed alkyl silicate and a vinyl triethoxysilane or a hydroxyl group-containing polymer (Japanese Laid Open application No. 26419/72, and French Pat. Nos. 1,483,448 and 1,483,449); a cured film of a mixture comprising a polysiloxane having 15 to 60 mole % of vinyl functional siloxane units and a compound represented by the formula, $(CH_3)_3SiO[(CH_3)HSiO]_n[(C_6H_5)_2SiO]_mSi(CH_3)_3$ (Japanese Laid Open patent application No. 355/74); a cured film of a hydrolyzate of methyl trialkoxysilane or phenyl trialkoxysilane (U.S. Pat. Nos. 3,389,114; 3,389,121; 3,451,838 and 3,460,980); a cured film of an alkanediol dimethacrylate (U.S. Pat. Nos. 3,097,106; 2,997,745 and 2,320,536, and Japanese patent publication Nos. 17847/60 and 10676/71); a cured film of a mixture comprising an unsaturated polyester and a di-(meth)acrylate (U.S. Pat. No. 2,320,536); a cured film of a diallyloxyalkyl maleate (U.S. Pat. No. 2,514,786); or a cured film of an N-carballyloxy ureidoallyl carbonate (U.S. Pat. No. 2,579,427).

When produced according to the above-mentioned processes, the molded articles of plastic can be improved in surface characteristics, particularly surface hardness, without any substantial deterioration in light transmittance thereof. For use as cover glass plates for watches and lenses for glasses, however, the molded articles of plastics produced according to the above-mentioned processes are not yet satisfactory for the following reasons: (1) the cover glass plates for watches and lenses for glasses are vigorously abraded with fine dust, so that even when they have been made of the said molded articles having improved surface characteristics, the surfaces thereof become dim due to abrasion, and (2) since watches and glasses are carried by men, the cover glass plates of the watches and the lenses of the glasses which have been made of the said molded articles are frequently brought into contact with water, dust and various chemicals and exposed to high temperatures, and the films on the surfaces of the molded articles are cracked or peeled off due to contact with water, dust or chemicals and due to influence of heat.

Aiming at producing molded plastics which are so excellent in surface characteristics as not to cause any such disadvantages as above even when used as cover glass plates for watches and lenses for glasses, the present inventors have conducted extensive studies to find that the aim can be achieved according to any of the below-mentioned three processes (1), (2) and (3), and, based on this finding, the inventors have accomplished the present invention.

1. A process by which a cured film of a coating material composed mainly of at least one polyfunctional compound selected from the group consisting of polymethacryloyloxy compounds having at least three methacryloyloxy groups in one molecule and polyacryloyloxy compounds having at least three acryloyloxy groups in one molecule is formed on the surface of a molded substrate of plastic.

2. A process by which a cured film of a coating material composed mainly of at least one polyfunctional compound selected from the group consisting of polymethacryloyloxy compounds having at least three methacryloyloxy groups in one molecule and polyacryloyloxy compounds having at least three acryloyloxy groups in one molecule, and a fluorine-containing surfactant is formed on the surface of a molded substrate of plastic.

3. A process by which a cured film of the same coating material as in the above-mentioned process (1) or (2) is formed on the surface of a molded substrate of plastic obtained by subjecting a thermoplastic to injection molding under specific conditions.

The plastics excellent in light transmittance which are used in the present invention include methacrylate resins such as polymethyl methacrylate, polycyclohexyl methacrylate, copolymers of methyl methacrylate with other vinyl monomers, and the like; polystyrene; acrylonitrile-styrene copolymers, polycarbonates, polyallyl diglycol carbonates; cellulose esters and the like. These plastics have markedly excellent light transmittance and weather resistance, and sufficiently display their effects particulary when used as organic plate glass, chandeliers, lenses for glasses such as fashion glasses and sunglasses, lenses for optical instruments such as cameras, microscopes and magnifiers, lenses for industrial equipments such as protective masks for welding, antigas masks, and windows for airplanes, and lenses for watches, but may also be utilized as covers for various meters, protective covers for record players, illumination covers, sign boards and other displays.

The coating material used in this invention is preferably composed of at least one polyfunctional compound selected from the group consisting of polymethacryloyloxy compounds having at least three methacryloyloxy groups in one molecule and a molecular weight of 250 to 800 and polyacryloyloxy compounds having at least three acryloyloxy groups in one molecule and a molecular weight of 250 to 800. A coating material composed mainly of a poly-(meth)acryloyloxy compound having a molecular weight of less than 250 cannot form a cured film sufficiently high in crosslinking density, so that a molded article of plastic high in abrasion resistance cannot be obtained by use of said coating material. On the other hand, a coating material composed mainly of a poly-(meth)acryloyloxy compound having a molecular weight of more than 800 is too high in viscosity, and thus too low in coatability, to form a film excellent in smoothness, so that a molded plastic excellent in optical properties cannot be obtained by use of said coating material.

The poly-(meth)acryloyloxy compound having at least three (meth)acryloyloxy groups in one molecule, which is used in the present invention, includes compounds obtained by reacting tri- or more-hydric alcohols with (meth)acrylic acid or derivatives of said acids. Examples of the tri- or more-hydric alcohol used in this case are glycerin, trimethylolethane, trimethylolpropane, pentaerythritol, diglycerin, ditrimethylolpropane, di-trimethylolethane and dipentaerythritol, and preferable examples of the poly-(meth)acryloyloxy compound are trimethylolpropane tri-(meth)acrylate, pentaerythritol tetra-(meth)acrylate and di-trimethylolpropane tetra-(meth)-acrylate. As the poly-(meth)-acryloyloxy compound, there may also be used any of the compounds obtained by reacting a saturated di- or tri-carboxylic acid with glycidyl (meth)acrylate and further with (meth)acrylic acid or a derivative thereof. These compounds can be synthesized according to, for example, the following reaction formulas:

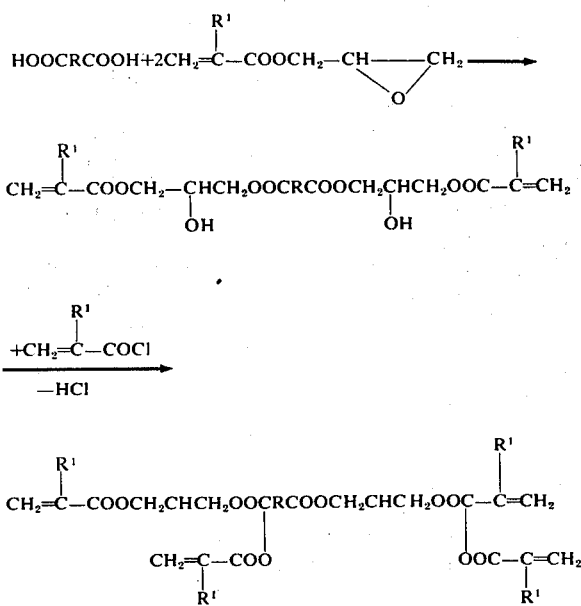

R: an alkylene, cycloalkylene, or arylene group having up to 12 carbon atoms.

$R^1$: hydrogen or methyl group.

Concrete examples of the saturated di- or tri-carboxylic acid used in synthesizing the poly-(meth)-acryloyloxy compound according to the above-mentioned reaction are succinic, adipic, sebacic, phthalic, terephthalic and hexahydrophthalic acids.

The coating material used in the present invention should contain at least 30 % by weight of the above-mentioned poly-(meth)acryloyloxy compound. When a coating material containing less than 30 % by weight of the poly-(meth)acryloyloxy compound is used, the resulting film becomes low in crosslinking density and thus is deteriorated in hardness, solvent resistance and water resistance, so that a molded article of plastic having improved surface characteristics aimed at by the present invention cannot be obtained by use of the said coating material. For improving the flexibility of the cured film to be formed on the surface of a molded substrate of plastic, it is preferable to use a coating material comprising at least 30 % by weight of the above-mentioned polyfunctional compound and less than 70 % by weight of at least one member selected from the group consisting of monoacryloyloxy, monomethacryloyloxy, diacryloyloxy and dimethacryloyloxy compounds. Examples of said mono-(meth-)acryloyloxy compounds include (meth)-acrylates having 1 to 10 carbon atoms such as, for example, methyl (meth)acrylate, ethyl (meth)acrylate, butyl (meth)-acrylate, propyl (meth)acrylate, 2-ethylhexyl (meth)-acrylate, hexyl (meth)acrylate, cyclohexyl (meth)-acrylate, benzyl (meth)acrylate and glycidyl (meth)-acrylate, and acrylic and methacrylic acids; and examples of said di-(meth)acryloyloxy compound include ethylene glycol di-(meth)acrylate, propylene glycol di-(meth)-acrylate 1,3-butanediol di-(meth)acrylate, 1,4-butanediol di-(meth)acrylate, neopentyl glycol di-(meth)acrylate, diethylene glycol di-(meth)acrylate, tetramethylene glycol di-(meth)acrylate, pentanediol di-(meth)acrylate and hexanediol di-(meth)acrylate.

It is not desirable that the coating material used in the present invention contains a poly-(meth)-acryloyl compound having other atoms than hyrogen, carbon and oxygen atoms. A cured film of a coating material compound mainly of a poly-(meth)acryloyl compound having other atoms than hydrogen, carbon and oxygen atoms is different in refractive index from the molded substrate of plastics excellent in light transmittance which is used in the present invention, and hence, an image, when viewed through a molded article of plastic, particularly lens of plastic, which has a cured film of such a coating material, is undesirably distorted. Furthermore, the cured film of said coating material is undesirably low in weather resistance, water resistance, chemical resistance, etc.

In order to further enhance the heat resistance, impact resistance and abrasion resistance, and to decrease the optical distortion, of the cured film of the molded article of plastic of this invention having improved surface characteristics, it is preferable to use a coating material prepared by incorporating into the aforesaid coating material a fluorine-containing surfactant which is soluble in the coating material. The fluorine-containing surfactant used in this case may be any of the fluorine-containing anionic, cationic, nonionic and amphoteric surfactants. Examples of the fluorine-containing anionic surfactants include potassium perfluorocarbon sulfonate, sodium perfluorocarbon carboxylate, N-sodium carboxymethyl perfluorocarbon sulfonamide, sodium perfluorocarbon sulfate, and the like; examples of the fluorine-containing cationic surfactants include perfluorocarbon sulfonamide ethyltrimethylammonium halides, perfluorocarbon sulfonamide propyldiméthylamine hydrogen halides, perfluorocarbon acid amide propyltrimethylammonium halides, and the like; examples of the fluorine-containing nonionic surfactants include N-alkyl perfluorocarbon sulfonamides, N-dimethylaminopropyl, perfluorocarbon sulfonamide, N-carboxymethyl perfluorocarbon sulfonamide, polyoxyethylene perfluorocarbon sulfonamide ethers, N-dimethylamino propyl perfluorocarbon acid amides, N-alkyl perfluorocarbon acid amides, polyoxyethylene perfluorocarbon acid amide ethers, perfluorocarbon sulfonic acids, perfluorocarbon acid alkyl esters, perfluorocarbon acid hydroxy amides, and the like; and examples of the fluorine-containing amphoteric surfactants include alkylamines having betaine-type perfluorocarbon sulfonamide linkages, and alkylamines having betaine-type perfluorocarbon acid amides. Among the above-mentioned surfactants, the fluorine-containing nonionic surfactants are particularly preferable for use in the present invention. A coating material containing the nonionic surfactant is excellent in coatability onto a molded substrate of plastic, and a molded article of plastics having a cured film of said coating material is not only excellent in surface hardness, surface smoothness, heat resistance, impact resistance and abrasion resistance but also less in optical distortion.

The amount of the fluorine-containing surfactant to be incorporated into the coating material is desirably in the range from 0.01 to 5 % by weight. When a coating material containing less than 0.01 % by weight of the fluorine-containing surfactant is used, it is impossible to obtain a molded article of plastic having desired effects derived from the use of the fluorine-containing surfactant, i.e. a molded article of plastic which has further been improved in surface hardness, surface smoothness, heat resistance and abrasion resistance and minimized in optical distortion. On the other hand, when a coating material containing more than 5 % by weight of the fluorine-containing surfactant is used, the adhesion between a cured film of the coating material and a molded substrate of plastics to be processed becomes insufficient to make it difficult to obtain a molded article of plastic excellent in surface characteristics such as surface hardness, impact resistance and the like.

The thickness of the cured film formed on the surface of a molded substrate of plastic is required to be in the range from 1 to 50 $\mu$, preferably from 3 to 30 $\mu$. A molded article of plastic having a cured film of less than 1 $\mu$ in thickness is inferior in abrasion resistance and surface smoothness. On the other hand, a molded article of plastic having a cured film of more than 50 $\mu$ in thickness is not only insufficient in flexibility of the film, but also distortion is formed in the film, and cracks tend to be formed in the cured film due to slight bending of the molded article of plastic. Further, when the said molded article of plastic is exposed to outdoor air, cracks are formed in the cured film as well. Accordingly, said molded articles cannot be used under such severe conditions as in the case of lenses for watches or glasses.

For the formation of a cured film from the aforesaid coating material, there may be adopted such a procedure that a coating of the coating material is formed on the surface of a molded substrate of plastic, and is then subjected to heat treatment or to irradiation either with a light of 2,000 to 8,000 A in wavelength or with a radiation such as $\alpha$-rays, $\beta$-rays, $\gamma$-rays or electron beam, thereby bringing about a crosslinking reaction in the coating. When the coating is to be subjected to heat treatment, the coating material should incorporate 0.01 to 5 % by weight of a polymerization initiator such as azobisisobutyronitrile, azobis-2,4-dimethylvaleronitrile, benzoyl peroxide or di-t-butyl peroxide. When the coating is to be subjected to irradiation with a light of 2,000 to 8,000 A, the coating material should incorporate 0.01 to 5 % by weight of a carbonyl compound such as benzoin, 2-methylbenzoin, benzoin methyl ether, benzoin ethyl ether, benzoin isopropyl ether, benzoin butyl ether, acetoin, butyroin, benzil or benzophenone as a photosensitizer. A cured film of a coating material containing more than 5 % by weight of the said carbonyl compound comes to be yellowed, with the result that the molded article of plastic is undesirably degraded in optical characteristics.

For the curing of such a coating material as in the present invention by irradiation with light, there has been proposed the substitution for the above carbonyl compound of a polychlorinated polyphenyl resin such as polychlorinated diphenyls, polychlorinated triphenyls, chlorinated rubbers, perchloropentacyclodecene, chlorinated paraffins, polybromobenzenes, dichloromaleic anhydride, 1-chloro-2-methylnaphthalene and 2-bromoethyl methyl ether as photosensitizer. However, these compounds are strong plasticizers, though they have actions as photosensitizer. When irradiated with light, therefore, films of coating materials containing said compounds as photosensitizer are converted into slightly tacky and markedly soft films which are easily damaged by slight scratch or impact. Accordingly, such coating materials cannot be used for the production of molded articles of plastic having improved surface characteristics aimed at by the present invention.

For the production of the above substrate of molded plastic, there may be adopted such conventional processes as injection molding, cast molding, compression molding, extrusion molding and transfer molding. For the production of the molded articles of the plastic of this invention having improved surface characteristics, however, it is preferable to adopt the following two processes, of which an explanation is made with reference to the case where a coating material containing a photosensitizer is used:

FIRST PROCESS

The first process is carried out in the following manner:

The coating material is coated to a predetermined thickness onto the inner surface of a mold for preparation of molded substrate of plastics, and then irradiated with, for example, a light of 2,000 to 8,000 A for several minutes in an oxygen-free-atmosphere to form a cured film on the inner surface of the mold. Subsequently, a vinyl monomer for forming molded articles of plastic, e.g. methacrylate syrup, is poured into the mold and polymerized under predetermined conditions, and the resulting molded article of plastic is taken out of the mold.

Alternatively, there may be adopted such a process that allyldiglycol carbonate is poured into a mold and polymerized under predetermined conditions to produce a molded substrate of plastic, and then the above-mentioned coating material is coated on the surface of the molded substrate and is cured to obtain a molded article having a cured film.

According to the above-mentioned process, it is possible to obtain a molded article of plastic having improved surface characteristics aimed at by the present invention. This process, however, has such a disadvantage that since a monomer or syrup is poured into a mold and polymerized, an extremely long period of time is required for the production of the molded article. In order to overcome the said disadvantage, it is preferable to adopt the second process mentioned below.

SECOND PROCESS

This process is carried out in such a manner that a thermoplastic resin such as polymethyl methacrylate, polycarbonate, cellulose ester or the like is used as the molding material and is injection molded and the coating material is coated on the molded substrate and then cured to obtain a molded article of plastic having improved surface characteristics.

In the case of the second process, stress strain or optical distortion is caused in the resulting molded substrate depending on the conditions of injection molding. When a cured film of the coating material is formed on the surface of such a molded substrate having internal strain, adhesion between the cured film and the molded substrate is inferior, and hence, the resulting article has such disadvantages that the cured film is easily cracked even when a slight impact is applied to the article, and that the cured film is peeled off from the molded substrate of plastic when the article is allowed to stand in a high temperature and humidity atmosphere.

For the production according to the second process of a molded substrate of plastic having improved surface characteristics, it is necessary to prepare a molded substrate free from internal strain, and for the preparation of such molded substrate, it is necessary to use a mold which satisfies the conditions $S_A/S_B \geq 0.2$, preferably $0.6 \geq S_A/S_B \geq 0.2$, wherein $S_A$ is the cross-sectional area of the joint portion between the gate and the cavity of the mold, and $S_B$ is the maximum cross-sectional area of the cavity. A mold, which is used in the injection molding of thermoplastics such as polymethyl methacrylate, is in general composed of a spool, a runner, a gate and a cavity. According to such an injection molding process as above, a molded substrate of plastic is produced in such a manner that the thermoplastic resin is melted, and the molten resin is fed to the spool of the mold and then introduced into the cavity of the mold through the runner and gate of the mold.

When a mold having an $S_A/S_B$ ratio of less than 0.2 is used, the flow speed of the molten resin which is introduced through the runner and gate into the cavity of the mold, becomes far lower at the cavity portion than at the gate portion. Such a great and rapid variation in flow speed of the molten resin in the mold brings about molecular orientation and molding strain in the resulting molded substrate of plastic. The molded substrate of plastic having such a molecular orientation and molding strain of the molding material is inferior in optical characteristics. Moreover, when a cured film is formed on the surface of said molded substrate, the molding strain present in the molded substrate becomes a source for generating the residual stress, so that the cured film is peeled off from the molded substrate or is cracked due to slight impact to make it impossible to obtain such an excellent molded article as that of the present invention.

In contrast thereto, when a mold having an $S_A/S_B$ ratio of 0.2 or more is used the molten resin in the mold is not so greatly different in flow speed at the gate portion from that at the cavity portion. Accordingly, neither orientation nor molding strain are brought about in the resulting molded substrate. Even when a cured film is formed on the surface of said molded substrate, the film is not easily peeled off from the molded substrate and is not cracked due to slight impact.

As mentioned previously, in producing a molded substrate by the injection molding process, the structure of the mold used is important for the production of a molded substrate excellent in optical characteristics and free from molding strain. Even when a mold of the aforesaid structure is used, however, there are some cases where molding strain is caused in the resulting molded substrate. With an aim to obtain an injection molded substrate having no such drawback as mentioned above, it is necessary that the following formulas are satisfied:

$$\frac{t_1}{t_1 + t_2 + t_3} \geq 0.1 \qquad [I]$$

$$\frac{V}{t_1 \times a} \leq 5 \text{ cc/sec·mm} \qquad [II]$$

wherein $t_1$ is the injection time, $t_2$ is the hold time, $t_3$ is the cooling time, V is the volume of the mold cavity, and a is the average thickness of the molded substrate.

When a molten resin is injection molded under such conditions that the times $t_1$, $t_2$ and $t_3$ satisfy the above-mentioned formula [I] and the apparent injection speed of the molding resin is 5 cc/sec.mm or less, the flow speed of the molding resin somewhat increases at a portion between the runner and the gate of the mold, but is considerably decreased while the molding resin passes through the gate. Accordingly, no rapid reduction in flow speed of the molding resin takes place in the mold cavity to cause neither orientation nor molding strain of the molding resin, with the result that the molding resin can be formed into a molded substrate of plastic excellent in optical characteristics and free from residual stress. While other injection molding conditions are not particularly limited, the mold temperature and the resin temperature are desirably made as high as possible within the ranges varying depending on the kind of the molding resin and the injection pressure is preferably made as low as possible.

On the molded substrate of plastic obtained according to the above-mentioned molding process, a coating material of such a specific composition as mentioned previously is coated by spray-, brush-, flow-, dip-, rotary- or roll-coating, and then subjected to heat treatment or to irradiation with a light of 2,000 to 8,000 Å or with a radiation such as α-rays, β-rays, γ-rays or electron beam, whereby a molded article of plastics having a cured film is obtained. Since the molded substrate has no molding strain, the cured film can firmly adhere onto the molded substrate, and is not peeled off from the molded substrate nor is cracked even when a considerably strong impact is applied thereto. In the case where the above-mentioned light or radiation is employed as a means for curing the coating, the molded substrate coated with the coating material is preferably irradiated with said light or radiation in an atmosphere of an inert gas such as, for example, nitrogen, carbon dioxide, combustion gas, argon, helium or krypton.

When the coating material used in the present invention is coated on the molded substrate of plastic and then exposed to a light through a negative film, the exposed portion of the resulting coating is cured while the unexposed portion thereof is left uncured. When the unexposed portion is removed, a molded article of plastic having a pattern-bearing cured film can be obtained.

The coating material according to the present invention may be used either as it is or in admixture with a dye or pigment.

The present molded article of plastic having improved surface characteristics is more excellent in surface hardness, abrasion resistance, scratch resistance and impact resistance than the conventional molded articles of plastic. Even when the molded article of plastic is allowed to stand in an atmosphere at a high temperature and a high humidity, the cured film is not peeled off from the surface of the molded substrate, nor is cracked.

While the molded articles of plastic of the present invention can, of course, be used as organic plate glass and furniture such as illumination covers, and construction materials, display materials and various sign boards, they can sufficiently display their effects when used, taking advantage of their excellent optical characteristics, surface hardness and mar resistance, as lenses for glasses such as fashion glasses, goggles, sunglasses and ophthalmic glasses, lenses for optical instruments such as cameras, microscopes and magnifiers, lenses for watches, or lenses for industrial equipments such as protective masks for welding, antigas masks and windows for airplanes.

The present invention is illustrated in further detail below with reference to Examples. In the Examples, all parts are by weight unless otherwise specified.

EXAMPLE 1

A coating material comprising 50 parts of pentaerythritol tetraacrylate, 40 parts of trimethylolpropane triacrylate, 10 parts of methacrylic acid, 2 parts of benzoin n-butyl ether and 0.5 part of each of the surfactants shown in Table 1 was coated by dip-coating on both sides of a polymethyl methacrylate plate having a thickness of 3 mm. to form a coating of the coating material on each side of the resin plate. Subsequently, the resin plate was placed below a high pressure mercury lamp of 3650 Å in main wavelength in a nitrogen atmosphere, and the coating was cured by UV-irradiation for 1 minute to obtain a plastic product having a cured film of about 25 $\mu$ in average thickness. The heat resistance, impact resistance, abrasion resistance and optical distortion of the product were measured to obtain the results as shown in Table 1.

The optical distortion was measured according to JIS B-9905 and represented by the following rankings:

X— Marked
Δ— Some
O— Scarce
◎— None

The heat resistance was evaluated by allowing the test piece to stand for 10 days at 50°C. and 60 % RH, and observing the change in state of the film.

The impact resistance was evaluated by dropping an iron ball of ⅝ inch in diameter from a height of 50 inches onto the film surface of the test piece, and observing the change in state of the film at the impact point.

The abrasion resistance was measured according to ASTM-D-673 and was represented by the haze value of the test piece after dropping 400 g. of No. 80 silicon carbide.

Table 1

| Run No. | Surfactant | Optical distortion | Heat resistance | Impact resistance | Abrasion resistance resistance (Haze value) (%) |
| --- | --- | --- | --- | --- | --- |
| 1 | Polyoxyethylene perfluorocarbonamide | ◎ | Excellent | Excellent | 0.8 |
| 2 | $C_5F_7H_4COOC_4H_9$ | ◎ | Excellent | Excellent | 0.5 |
| 3 | Potassium perfluorooctasulfonate | O | Excellent | Excellent | 0.9 |
| 4 | Polyoxyethylene perfluorocarbonamide 0.05 part  Polyethylene glycol oleyl ether 0.05 part | ◎ | Excellent | Excellent | 0.8 |
| 5 (Control) | — | X (Film became uneven) | Peeled | Cracked | 5.3 |
| 6 (Control) | Sorbitan monostearate | Δ | Excellent | Partly cracked | 2.3 |
| 7 (Control) | Polyethylene glycol oleic acid ester | Δ | Excellent | Partly cracked | 1.5 |
| 8 (Control) | N—Alkylacetamide | Δ | Partly peeled | Excellent | 5.3 |

As is clear from the results shown in Table 1, the products obtained by the process of the present invention do not cause optical distortion or unevenness of film surface which deteriorated the optical characteristics of the products, and, moreover, are excellent in heat resistance, impact resistance and abrasion resistance.

EXAMPLE 2

A coating material comprising 40 parts of pentaerythritol tetraacrylate, 40 parts of trimethylolpropane triacrylate, 18 parts of ethylene glycol di-methacrylate, 2 parts of benzoin n-butyl ether, and 0.5 part of each of the surfactants shown in Table 2 was coated by spray-coating on both sides of a sunglass lens prepared by compression-molding a polymethyl methacrylate plate. Subsequently, the lens was irradiated with light for 3 minutes in the same manner as in Example 1 to obtain a lens having a cured film of about 20 $\mu$ in thickness. The properties of the thus obtained lens were tested in the same manner as in Example 1 to obtain the results as shown in Table 2.

Table 2

| Run No. | Surfactant | Optical distortion | Heat resistance | Impact resistance | Abrasion resistance (Haze value) (%) |
|---|---|---|---|---|---|
| 9 | Polyoxyethylene perfluorocarbon sulfonamide | ⊙ | Excellent | Excellent | 0.7 |
| 10 | Polyoxyethylene perfluorocarbonamide | ⊙ | Excellent | Excellent | 0.3 |
| 11 | $HC_6F_{12}CH_2OCH_3$ | O | Excellent | Excellent | 0.5 |
| 12 | Perfluorocarbon sulfonamide propyldimethylamine hydrogen chloride | ⊙ | Excellent | Excellent | 0.9 |
| 13 | N—Potassium carboxymethyl perfluorocarbon sulfonamide | O | Excellent | Excellent | 0.8 |
| 14 (Control) | Dialkyl sulfosuccinate | Δ | Excellent | Partly peeled | 3.2 |
| 15 (Control) | Polyethylene glycol oleyl ether | Δ | Partly cracked | Excellent | 2.5 |
| 16 (Control) | Polypropylene glycol polyethylene glycol ether | Δ | Excellent | Partly peeled | 4.0 |

From the results shown in Table 2, it is recognized that the products obtained by the process of the present invention are excellent in heat resistance, abrasion resistance and impact resistance, cause no optical distortion, and have sufficient characteristics as lenses.

A lens having excellent surface characteristics was obtained also in the case where a plastic lens prepared by injection molding of polymethyl methacrylate was treated in the same manner as above.

EXAMPLE 3

Each of coating materials of the compositions A, B and C shown in Table 3 was coated by spray-coating on a cast-mold polyallyl diglycol carbonate lens. To this lens was closely adhered quartz glass which had been shaped in conformity to the shape of the lens. Subsequently, the lens was irradiated for about 30 minutes with a chemical lamp of 3650 A in main wavelength to obtain a surface-cured plastic lens having a cured film of 11 to 13 $\mu$ in thickness.

Table 3

| Components | Coating material (parts by weight) | | |
|---|---|---|---|
| | A | B | C |
| Trimethylolpropane triacrylate | 40 | 40 | 40 |
| Neopentyl glycol diacrylate | 28 | 28 | 28 |
| 1,3-Butylene glycol dimethacrylate | 30 | 30 | 30 |
| Benzoin isopropyl ether | 2 | 2 | 2 |
| Polyoxyethylene perfluorocarbonamide | 0 | 0.2 | 3 |

The lenses obtained in the above manner had little optical distortion as compared with the conventional commercially available lenses, showed no change even when allowed to stand at 50°C. for 10 days, were excellent in heat resistance and high in impact strength and surface hardness, and had markedly prominent surface characteristics.

Further, each of the same coating materials A and B as above, except that no photosensitizer was contained therein, was coated on the same lens as above. Subsequently, the surface of the lens was irradiated in a nitrogen atmosphere with electron beam using an electron beam accelerator having an acceleration voltage of 300 KV and a beam current of 25 mA so that the absorbed dose became 10 Mrad at a dose rate of 3 Mrad/sec. to prepare two plastic lenses. The thus prepared lenses were excellent in heat resistance, impact resistance and surface hardness.

EXAMPLE 4

An injection molding polymethyl methacrylate was dried at 80°C. for 8 hours. Using an injection molding machine "V-15-75" manufactured by Nihon Seikosho Co., which had been equipped with a round lens-shaping mold ($S_A/S_B = 0.306$) having a cavity of 78 mm. in diameter, 2.2 mm. in thickness (a), 50 cc. in volume (V) and 180 mm$^2$ in maximum cross-section area ($S_B$), and a gate of 25 mm. in exit width, 2.2 mm. in thickness and 55 mm$^2$ in exit cross-sectional area ($S_A$), the above-mentioned resin was injection-molded into a plastic lens under the below-mentioned molding conditions, in which the injection time ($t_1$), the hold time ($t_2$) and the apparent injection speed were varied.

| Molding conditions: | |
|---|---|
| Cylinder temperature | 265°C. |
| Injection pressure (gauge) | 70 kg/cm² |
| Mold temperature | 77°C. |
| Injection time ($t_1$) | $t_1$ seconds |
| Hold time ($t_2$) | $t_2$ seconds |
| Cooling time ($t_3$) | 10 seconds |
| Apparent injection speed | $\frac{V}{t_1 \times a}$ (cc/sec·mm) |

Among the injection molding conditions mentioned above, the conditions $t_1$, $t_2$, $t_1/(t_1 + t_2 + t_3)$ and $V/(t_1 \times a)$ were as shown in Table 4.

Table 4

| Run No. | Injection time $t_1$ (sec) | Hold time $t_2$ (sec) | $\frac{t_1}{t_1+t_2+t_3}$ | Apparent injection speed $\frac{V}{t_1 \times a}$ (cc/sec·mm) |
|---|---|---|---|---|
| 17 | 4.9 | 10.1 | 0.196 | 4.64 |
| 18 | 6.2 | 8.8 | 0.248 | 3.67 |

The surfaces of the two plastic lenses obtained in Run Nos. 17 and 18 by injection molding the aforesaid resin under the above-mentioned conditions were individually spray-coated with a coating material (D) comprising 24 parts of pentaerythritol tetraacrylate, 45 parts of trimethylolpropane triacrylate, 30 parts of ethylene glycol dimethacrylate and 1 part of benzoin n-butyl ether, and then irradiated for 1 minute with a high pressure mercury lamp in a carbon dioxide atmosphere to form on the surfaces of each plastic lens a transparent cured film having an average thickness of 20 μ.

The thus obtained plastic lenses each having the cured film on the surface thereof were subjected to adhesion test carried out in such a manner that in the film of each plastic lens, 100 squares of 1 mm × 1 mm having grooves of a depth reaching the plastic substrate were formed by cutting with a knife, thereafter an adhesive tape was adhered to the square-bearing portion of the film and then stripped off from the film, and the adhesion between the film and the plastic substrate was evaluated by the number of tape-stripping times required for peeling the film from the substrate. As the result, the cured resin films formed on both plastic lenses obtained in Run Nos. 17 and 18 did not peel off even when the stripping of adhesive tape was repeated 30 times. Further, the films did not peel even when the plastic lenses were subjected to immersion test in hot water at 60°C. for 24 hours. Thus, it was confirmed that the plastic lenses according to the present invention were excellent in adhesion between the cured films and the plastic substrates.

On each of the plastic lens substrates obtained in Run Nos. 17 and 18, a cured film was formed by any of the procedures described below, whereby the adhesion between the cured film and the lens substrate could be further enhanced.

I. The plastic lens substrate was immersed in a methyl methacrylate monomer for 2 minutes, and then allowed to stand still to evaporate excess monomer. In the same manner as in Example 4, the aforesaid coating material (D) was coated on said plastic lens substrate, and then cured to form a cured film on the lens substrate. The adhesion of the cured film to the lens substrate was more excellent than in the case where the lens substrate was not subjected to monomer treatment.

II. The coating material (D) was coated on the surface of the plastic lens substrate in the same manner as in Example 4 and then cured by irradiation with a high pressure mercury lamp, first in air at 45°C. for 30 seconds and then in a nitrogen gas atmosphere for 30 seconds to form a cured film on the lens substrate. The adhesion of the cured film to the lens substrate was more excellent than in the case of a cured film formed by irradiation with a high pressure mercury lamp in a nitrogen atmosphere for 3 minutes, without conducting the first irradiation in air.

III. The coating material (D) was coated on the surface of the plastic lens substrate in the same manner as in Example 4, and then cured by irradiation, from the side opposite to the coated side, with a high pressure mercury lamp in a nitrogen atmosphere for 3 minutes to form a cured film on the lens substrate. The adhesion of the cured film to the lens substrate was more excellent than in the case of a cured film formed by irradiation from the coated side.

IV. The coating material (D) was incorporated with 4 parts of benzoin n-butyl ether as a photosensitizer, and this coating material (D') was coated on the plastic lens substrate to a thickness of about 5 μ. On the coated side of the lens substrate, the coating material (D) was further coated to a thickness of about 15μ to form a two-layered coating. This coating was irradiated for 3 minutes with a high pressure mercury lamp in a nitrogen atmosphere to form a cured film on the lens substrate. The adhesions of the cured film to the lens substrate was more excellent than in the case of a cured film formed by the one-layered coating of the coating material (D) or (D').

EXAMPLE 5

The coating material (D), which had been incorporated with 0.5 part of each of the surfactants shown in Table 5, was spray-coated on the plastic lens substrate used in Run No. 18, and then irradiated with a light for 1 minute in the same manner as in Example 1 to obtain a plastic lens having a cured film of 10 μ in thickness. The optical distortion, impact resistance, heat resistance and abrasion resistance of the thus obtained plastic lens were measured in the same manner as in Example 1 to obtain the results as shown in Table 5.

Table 5

| Run No. | Surfactant | Optical distortion | Impact resistance | Heat resistance | Abrasion resistance | |
|---|---|---|---|---|---|---|
| | | | | | Haze value (%) | Steel wool test |
| 19 | Polyoxyethylene perfluorocarbon sulfonamide | ◎ | Excellent | Excellent | 0.8 | More than 3,000 g. |
| 20 | Polyoxyethylene perfluorocarbonamide | ◎ | Excellent | Excellent | 0.5 | " |

Table 5-continued

| Run No. | Surfactant | Optical distortion | Impact resistance | Heat resistance | Abrasion resistance Haze value (%) | Abrasion resistance Steel wool test |
|---|---|---|---|---|---|---|
| 21 | $HC_6F_{12}CH_2OCH_3$ | ◎ | Excellent | Excellent | 0.6 | " |
| 22 | Perfluorocarbon sulfonamide propyldimethylamine hydrogen chloride | ◎ | Excellent | Excellent | 0.9 | " |
| 23 | Potassium perfluorocarbon sulfate | ◎ | Excellent | Excellent | 0.8 | " |
| 24 (Control) | Dialkyl sulfosuccinate | Δ – O | Excellent | Partly peeled | 3.1 | 2,500 g. |
| 25 (Control) | Polyethylene glycol oleyl ether | Δ – O | Partly cracked | Excellent | 2.4 | More than 2,500 g. |
| 26 (Control) | Polypropylene glycol polyethylene glycol ether | Δ – O | Excellent | Partly peeled | 4.0 | 2,000 g. |

In Table 5, the value of "Steel wool test" was represented by a load required to be marred when a 25 mm-diameter pat made of No. 000 Steel Wool was contacted 100 times with the test piece under a definite load and rotated at 40 r.p.m.

EXAMPLE 6

An injection molding polycarbonate resin was dried at 120°C. for 10 hours. Using an in-line screw type injection molding machine ("Nikko V-25-20" manufactured by Nihon Seikosho Co.) which had been equipped with a square plate-shaping metal mold ($S_A/S_B = 0.417$) having a cavity of 100 mm × 100 mm × mm thickness (a) in size, 30 cc. in volume (V) and 300 mm² in maximum cross-sectional area ($S_B$), and a gate of 50 mm. in exit width, 2.5 mm. in thickness and 125 mm² in exit cross-sectional area ($S_A$), the above-mentioned polycarbonate resin was injection-molded under the below-mentioned molding conditions to obtain a molded plastic plate.

Molding conditions:
Cylinder temperature     290°C.
Injection pressure (gauge)  80 kg/cm²
Mold temperature          84°C.
Injection time            $t_1$ seconds
Hold time                 $t_2$ seconds
Cooling time (t)          7 seconds
Apparent injection speed  $\frac{V}{t_1 \times a}$ (cc/sec·mm)

The values of $t_1$ and $t_2$, and thus the values of $t_1/(t_1 + t_2 + t_3)$ and $V/(t_1 \times a)$, were varied as shown in Table 6.

Table 6

| Run No. | Injection time $t_1$ (sec) | Hold time $t_2$ (sec) | $\frac{t_1}{t_1+t_2+t_3}$ | Apparent injection speed $\frac{V}{t_1 \times a}$ (cc/sec·mm) |
|---|---|---|---|---|
| 27 | 2.2 | 9.8 | 0.110 | 4.55 |
| 28 | 3.7 | 8.3 | 0.185 | 2.70 |
| 29 | 5.1 | 6.9 | 0.255 | 1.96 |

The surfaces of the molded plastic plates obtained in Run Nos. 27 to 29 were individually coated with a coating material comprising 60 parts of pentaerythritol tetraacrylate, 10 parts of trimethylolpropane triacrylate, 20 parts of ethylene glycol diacrylate, 10 parts of methyl methacrylate and 5 parts of benzoin n-propyl ether, and then irradiated for 10 minutes with a high pressure mercury lamp in a nitrogen atmosphere to form on the surface of each plastic plate a transparent cured film having an average thickness of 15 μ.

The thus obtained plastic plates each having the cured film on the surface thereof were subjected to the same adhesion test as in Example 4. As the result, the films formed on the plastic plates obtained in Run Nos. 27 to 29 did not peel off even when the stripping of adhesive tape was repeated 30 times. Further, the films did not peel off even when the plastic plates were subjected to immersion test in hot water at 90°C. for 24 hours.

EXAMPLE 7

An injection molding polymethyl methacrylate was dried according to an ordinary procedure. Using the same injection molding machine as in Example 6 which had been equipped with a convex lens-shaping mold ($S_A/S_B = 0.22$) having a cavity of 60 mm. in diameter, 3.5 mm. in thickness (a), 9.9 cc. in volume (V) and 50 mm² in exit cross-sectional area ($S_B$) and a gate of 5.5 mm. in exit width, 2.0 mm. in thickness and 11 mm² in exit cross-sectional area ($S_A$), the above-mentioned methacrylate resin was injection-molded under the below-mentioned molding conditions to obtain a convex lens.

Molding conditions:
Cylinder temperature     245°C.
Injection pressure (gauge)  90 kg/cm²
Mold temperature          63°C.
Injection time            $t_1$ seconds
Hold time                 $t_2$ seconds
Cooling time ($t_3$)       6 seconds
Apparent injection speed  $\frac{V}{t_1 \times a}$ (cc/sec·mm)

The values of $t_1$ and $t_2$, and thus the values of $t_1/(t_1 + t_2 + t_3)$ and $V/(t_1 \times a)$, were varied as shown in Table 7.

Table 7

| Run No. | Injection time $t_1$ (sec) | Hold time $t_2$ (sec) | $\frac{t_1}{t_1+t_2+t_3}$ | Apparent injection speed $\frac{V}{t_1 \times a}$ (cc/sec·mm) |
|---|---|---|---|---|
| 30 | 1.3 | 3.7 | 0.12 | 2.18 |
| 31 | 1.9 | 3.1 | 0.16 | 1.49 |

The surfaces of the molded convex lenses obtained in Run Nos. 30 and 31 were individually rotary-coated with a coating material comprising 40 parts of pentaerythritol tetraacrylate, 30 parts of trimethylolpropane triacrylate, 20 parts of propylene glycol diacrylate, 0.75 part of benzoin isobutyl ether and 0.5 part of a fluorine type nonionic surfactant ("FC 431" produced by 3M Co.), and then irradiated for 4 minutes with a carbon arc in a helium atmosphere to form on the surface of each convex lens a transparent cured film having an average thickness of 10 $\mu$.

The thus obtained convex lenses each having the cured film on the surface thereof were subjected to the same adhesion test as in Example 4. However, the films formed on the convex lenses obtained in Run Nos. 30 and 31 did not peel off even when the stripping of adhesive tape was repeated 30 times. Further, the films did not peel off even when the convex lenses were subjected to immersion test in hot water at 80°C.

EXAMPLE 8

Using an injection molding machine equipped with a convex lens-shaping mold ($S_A/S_B = 0.325$) having a cavity of 60 mm. in diameter, 2 mm. in thickness and 142 mm² in maximum cross-sectional area ($S_B$) and a gate of 5 mm. in inlet width, 25 mm. in exit width, 2 mm. in thickness and 50 mm² in exit cross-sectional area ($S_A$), polymethyl methacrylate was injection-molded under the conditions of a cylinder temperature of 260°C., an injection time of 5 seconds, an injection pressure of 100 kg/cm² (gauge) and a mold temperature of 60°C. to prepare a molded plastic convex lens.

The surface of the molded plastic lens was coated with the coating material used in Run No. 9 of Example 2, and then irradiated for 3 minutes with a high pressure mercury lamp in a nitrogen atmosphere to obtain a lens-shaped plastic article having a cured film on the surface. The thus obtained plastic article was subjected to the same adhesion test as in Example 4. However, the film did not peel off at all even when the stripping of adhesive tape was repeated 10 times. Furthermore, the film was so hard as not to be marred even when abraded with Steel Wool No. 000.

COMPARATIVE EXAMPLE 1

A molded plastic lens was prepared by repeating the injection molding operation of Example 8, except the use of a mold ($S_A/S_B = 0.074$) having a gate of 5 mm. in both exit width and inlet width. The molded plastic lens was then treated in the same manner as in Example 8 to obtain a molded plastic article having a cured film on the surface. The film of the thus obtained plastic article was insufficient in adhesion to the molded plastic lens so that the film at a portion near the gate portion of the molded plastic lens was peeled off when the stripping of adhesive tape was repeated 2 times, and even the film at a portion somewhat distanced from the gate portion of the molded plastic lens was also peeled off when the adhesive tape-stripping was repeated 5 times.

COMPARATIVE EXAMPLE 2

A molded plastic lens was prepared by repeating the injection molding operation of Example 8, except the use of a mold ($S_A/S_B = 0.183$) having a gate of 15 mm. in exit width and 30 mm² in exit cross-sectional area. The molded plastic lens was treated in the same manner as in Example 8 to obtain a molded plastic article having a cured film on the surface. The film of the thus obtained plastic article was insufficient in adhesion to the molded plastic lens so that when the plastic article was immersed in boiling water for 2 hours, the film at a portion near the gate portion of the molded plastic lens was peeled off.

EXAMPLE 9

An injection molding polymethyl methacrylate was dried at 80°C. for 8 hours. Using an injection molding machine ("V-15-75" manufactured by Nihon Seikosho Co.) which had been equipped with a flat plate-shaping mold having a size of 100 mm × 100 mm. an average thickness (a) of 2 mm. and a volume (V) of 20 cc., the above-mentioned methacrylate resin was injection-molded under the below-mentioned conditions to obtain a molded plastic plate.

Molding conditions:
Cylinder temperature 270°C.
Injection pressure (gauge) 50 kg/cm²
Mold temperature 60°C.
Injection time $t_1$ seconds
Hold time $t_2$ seconds
Cooling time ($t_3$) 8 seconds
Apparent injection speed $\frac{V}{t_1 \times a}$ (cc/sec·mm)

The values of $t_1$ and $t_2$, and thus the values of $t_1/(t_1 + t_2 + t_3)$ and $V/(t_1 \times a)$, were varied as shown in Table 8.

Table 8

| Run No. | Injection time $t_1$ (sec) | Hold time $t_2$ (sec) | $\frac{t_1}{t_1+t_2+t_3}$ | Apparent injection speed $\frac{V}{t_1 \times a}$ (cc/sec·mm) |
|---|---|---|---|---|
| 32 (Control) | 0.7 | 14.3 | 0.030 | 14.3 |
| 33 (Control) | 1.2 | 13.8 | 0.052 | 8.4 |
| 34 (Control) | 2.1 | 12.9 | 0.091 | 4.8 |
| 35 (Present invention) | 3.5 | 11.5 | 0.15 | 2.8 |
| 36 (Present invention) | 6.3 | 8.7 | 0.27 | 1.6 |

The surfaces of the molded resin plates obtained in Run Nos. 32 to 36 were individually dip-coated with the coating material used in Example 7, and then irradiated for 3 minutes with a high pressure mercury lamp in a nitrogen atmosphere to form on the surface of each resin plate a transparent cured film having an average thickness of 20 $\mu$.

The thus obtained resin plates each having the cured film on the surface thereof were subjected to the same adhesion test and immersion test as in Example 4 to obtain the results as shown in Table 9.

Table 9

| Run No. | Adhesion test (times of stripping of adhesive tape) | Immersion test (in hot water at 60°C. for 24 hours) |
|---|---|---|
| 32 | Wholly peeled by one time-stripping | Partly peeled |
| 33 | " | " |
| 34 | Partly peeled by one time-stripping | " |
| 35 | Not peeled even by 20 time-stripping | Not peeled |
| 36 | " | " |

From the results shown in Table 9, it is understood that a molded plastic article composed of a molded plastic plate and a cured film formed on the surface thereof, which article is excellent in adhesion between the plastic plate and the cured film, can be obtained when the plastic plate has been prepared by injection-molding a plastic under such conditions that both the injection time and the apparent injection speed satisfy the molding conditions regulated by the present invention.

What is claimed is:

1. A molded article of plastic having improved surface characteristics which comprises a molded substrate of plastic and a cured film formed on the surface of the molded substrate, characterized in that the cured film is formed from a coating material comprising at least 30 % by weight of at least one polyfunctional compound selected from the group consisting of polymethacryloyloxy compounds having at least three methacryloyloxy groups in one molecule and a molecular weight of 250 to 800 and polyacryloyloxy compounds having at least three acryloyloxy groups in one molecule and a molecular weight of 250 to 800, and a fluorine-containing surfactant, in which the fluorine atom, is bonded to a carbon atom.

2. A molded article of plastic according to claim 1, wherein the molded substrate of plastic is prepared from one member selected from the group consisting of polymethyl methacrylate, methyl methacrylate copolymers, polystyrene, styrene-acrylonitrile copolymers, polyallyl-diglycol carbonates, polycarbonates and cellulose esters.

3. A molded article of plastic according to claim 1, wherein the molded substrate of plastic is prepared by subjecting a thermoplastic resin to injection molding using a mold capable of satisfying the condition represented by the formula, $$S_A/S_B \geq 0.2$$

wherein $S_A$ is the cross-sectional area of the joint portion between the gate and the cavity, and $S_B$ is the maximum cross-sectional area of the cavity.

4. A molded article of plastic according to claim 1, wherein the molded substrate of plastic is prepared by subjecting a thermoplastic resin to injection molding under such conditions that the injection time $t_1$ satisfies the formulas:

$$\frac{t_1}{t_1 + t_2 + t_3} \geq 0.1 \quad \text{and} \quad \frac{V}{t_1 \times a} \leq 5 \text{ cc/sec·mm}$$

wherein $t_1$ is the injection time, $t_2$ is the hold time, $t_3$ is the cooling time, $V$ is the volume of the mold cavity, and $a$ is the average thickness of the molded substrate.

5. A molded article of plastic according to claim 1, wherein the molded substrate of plastic is prepared by subjecting a thermoplastic resin to injection molding using a mold capable of satisfying the condition represented by the formula, $S_A/S_B \geq 0.2$, wherein $S_A$ and $S_B$ are as defined above, and under such conditions that the injection time $t_1$ satisfies the formulas:

$$\frac{t_1}{t_1 + t_2 + t_3} \geq 0.1 \quad \text{and} \quad \frac{V}{t_1 \times a} \leq 5 \text{ cc/sec·mm}$$

wherein $t_1$, $t_2$, $t_3$, $V$ and $a$ are as defined above.

6. A molded article of plastic according to claim 1, wherein the cured film is formed from a coating material comprising at least 30 % by weight of at least one polyfunctional compound selected from the group consisting of polymethacryloyloxy compounds having at least three methacryloyloxy groups in one molecule and a molecular weight of 250 to 800 and polyacryloyloxy compounds having at least three acryloyloxy groups in one molecule and a molecular weight of 250 to 800, and at least one member selected from the group consisting of monoacryloyloxy, monomethacryloyloxy, diacryloyloxy and dimethacryloyloxy compounds.

7. A molded article of plastic according to claim 1, wherein the thickness of the cured film is 1 to 50μ.

8. A molded article of plastic according to claim 1, wherein the content of the fluorine-containing surfactant in the coating material is 0.01 to 5 % by weight.

9. A molded article of plastic according to claim 1, wherein the molded substrate of plastics is a lens shaped one.

10. A molded article of plastic according to claim 1, wherein the polyfunctional compound is a 2:8 to 8:2 weight ratio mixture of at least one of triacryloyloxy and trimethacryloyloxy compounds having a molecular weight of 250 to 800 and at least one of tetraacryloyloxy and tetramethacryloyloxy compounds having a molecular weight of 250 to 800.

11. A molded article of plastic according to claim 1, wherein the polyfunctional compound is selected from the group consisting of trimethylolpropane triacrylate, trimethylolpropane trimethacrylate, pentaerythritol tetraacrylate, pentaerythritol tetramethacrylate, glycerol triacrylate, glycerol trimethacrylate, di-trimethylolpropane tetraacrylate and di-trimethylolpropane tetramethacrylate.

12. A molded article of plastic having improved surface characteristics characterized in that % coating material comprising a polyfunctional compound consisting of 40 to 90 % by weight of a 2:8 to 8:2 weight ratio mixture of at least one of triacryloyloxy and trimethacryloyloxy compounds having a molecular weight of 250 to 800 and at least one of tetraacryloyloxy and tetramethacryloyloxy compounds having a molecular weight of 250 to 800, and 10 to 60 % by weight of at least one of diacryloyloxy, dimethacryloyloxy, monoacryloyloxy and monomethacryloyloxy compounds, 0.01 to 5 % by weight, based on the weight of the coating material, of a carbonyl compound as a photosensitizer and 0.01 to 5 % by weight, based on the weight of the coating material, of a fluorine-containing nonionic surfactant, in which the fluorine atom, is bonded to a carbon atom, is coated on the surface of a molded substrate of plastic, and is then irradiated with light of a wavelength of 2,000 to 8,000 A in an inert atmosphere to form a cured film of 3 to 30μ in thickness, said molded substrate being prepared by injection-molding polymethyl methacrylate, methyl methacrylate copolymer or polycarbonate under such conditions that the following three formulas are satisfied:

$$S_A/S_B \geq 0.2$$

$$\frac{t_1}{t_1 + t_2 + t_3} \geq 0.1$$

$$\frac{V}{t_1 \times a} \leq 5 \text{ cc/sec·mm}$$

wherein $S_A$, $S_B$, $t_1$, $t_2$, $t_3$, V and $a$ are as defined above.

13. A molded article of plastic according to claim 1, wherein the fluorine-containing surfactant, in which the fluorine atom, is bonded to a carbon atom is nonionic.

14. A molded article of plastic according to claim 13, wherein the nonionic surfactant is selected from the group consisting of N-alkyl perfluorocarbon sulfonamides, N-dimethylaminopropyl perfluorocarbon sulfonamide, N-carboxylmethyl perfluorocarbon sulfonamide, polyoxyethylene perfluorocarbon sulfonamide ethers, N-dimethylamino propyl perfluorocarbon acid amides, N-alkyl perfluorocarbon acid amides, polyoxyethylene perfluorocarbon acid amide ethers, perfluorocarbon sulfonic acids, perfluorocarbon acid alkyl esters, and perfluorocarbon acid hydroxy amides.

* * * * *